United States Patent
Chu et al.

(10) Patent No.: US 11,715,044 B2
(45) Date of Patent: Aug. 1, 2023

(54) METHODS AND SYSTEMS FOR HORIZONTAL FEDERATED LEARNING USING NON-IID DATA

(71) Applicant: HUAWEI CLOUD COMPUTING TECHNOLOGIES CO., LTD., Gui'an New District (CN)

(72) Inventors: Lingyang Chu, Burnaby (CA); Yutao Huang, Port Moody (CA); Yong Zhang, Toronto (CA); Lanjun Wang, Toronto (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 311 days.

(21) Appl. No.: 16/890,682

(22) Filed: Jun. 2, 2020

(65) Prior Publication Data
US 2021/0374617 A1    Dec. 2, 2021

(51) Int. Cl.
G06N 20/20    (2019.01)
G06F 17/16    (2006.01)
G06N 5/043    (2023.01)

(52) U.S. Cl.
CPC ............ G06N 20/20 (2019.01); G06F 17/16 (2013.01); G06N 5/043 (2013.01)

(58) Field of Classification Search
CPC ......... G06N 20/20; G06N 5/043; G06F 17/16
(Continued)

(56) References Cited

U.S. PATENT DOCUMENTS 11,373,115 B2 *  6/2022  Kopp ................. G06V 20/56
2017/0147920 A1  5/2017  Huo et al.
(Continued)

FOREIGN PATENT DOCUMENTS

CN    109871702 A    6/2019
CN    110647765 A    1/2020
(Continued)

OTHER PUBLICATIONS

Jeong, et al. "Communication-Efficient On-Device Machine Learning: Federated Distillation and Augmentation under Non-IID Private Data", arXiv:1811.11479v1 [cs.LG] Nov. 28, 2018 (Year: 2018).*
(Continued)

*Primary Examiner* — Omar F Fernandez Rivas
*Assistant Examiner* — Shamcy Alghazzy

(57)    ABSTRACT

Methods and systems for horizontal federated learning are described. A plurality of sets of local model parameters is obtained. Each set of local model parameters was learned at a respective client. For each given set of local model parameters, collaboration coefficients are computed, representing a similarity between the given set of local model parameters and each other set of local model parameters. Updating of the sets of local model parameters is performed, to obtain sets of updated local model parameters. Each given set of local model parameters is updated using a weighted aggregation of the other sets of local model parameters, where the weighted aggregation is computed using the collaboration coefficients. The sets of updated local model parameters are provided to each respective client.

18 Claims, 7 Drawing Sheets

(58) Field of Classification Search
USPC .......................................................... 706/12
See application file for complete search history.

(56) References Cited

U.S. PATENT DOCUMENTS

| | | | |
|---|---|---|---|
| 2018/0018590 | A1 | 1/2018 | Szeto et al. |
| 2020/0184261 | A1* | 6/2020 | Sankaran ............... G06F 18/40 |
| 2020/0285984 | A1* | 9/2020 | Bejjam ................... G06N 5/04 |
| 2021/0004682 | A1* | 1/2021 | Gong ...................... G06N 3/08 |
| 2021/0117780 | A1* | 4/2021 | Malik ..................... G06N 5/022 |

FOREIGN PATENT DOCUMENTS

| | | |
|---|---|---|
| CN | 110968426 A | 4/2020 |
| CN | 111177249 A | 5/2020 |

OTHER PUBLICATIONS

Li, et al., "Abnormal client behavior detection in federated learning", arXiv:1910.09933v2 [cs.LG] Dec. 6, 2019 (Year: 2019).*

Q. Yang et al., "Federated Machine Learning: Concept and Applications", ACM Transactions on Intelligent Systems and Technology (TIST), vol. 10, No. 2, Article 12, 2019.

H. B. McMahan et al., "Communication-Efficient Learning of Deep Networks from Decentralized Data", Proceedings of the 20th International Conference on Artificial Intelligence and Statistics (AISTATS), 2017.

T. Li et al., "Federated Optimization in Heterogeneous Networks", Proceedings of the 3rd MLSys Conference, 2020.

V. Smith et al., "Federated Multi-Task Learning", Advances in Neural Information Processing Systems (NeurIPS), pp. 4424-4434, 2017.

International Search Report dated May 26, 2021, PCT/CN2021/078554, 9 pages.

Hongyi Wang et al: "Federated Learning with Matched Averaging", D1 arxiv.org, Cornell University Library, 201 OLIN Library Cornell University Ithaca, NY 14853, Feb. 15, 2020 (Feb. 15, 2020), XPOS 1600787, total 16 pages.

* cited by examiner

METHODS AND SYSTEMS FOR HORIZONTAL FEDERATED LEARNING USING NON-IID DATA

FIELD

The present disclosure relates to methods and systems for training and deployment of machine learning-based models, in particular methods and systems for performing horizontal federated learning to learn a model related to a task using machine learning and non-informally, identically distributed data.

BACKGROUND

The usefulness of artificial intelligence (AI) or machine-learning systems rely on the large amounts of data that are used in the training process of these systems. However, many real-world application only have limited amounts of low quality data, which makes the application of AI technologies difficult in some applications.

There has been interest in how to leverage data from multiple diversified sources, to learn a model related to a task using machine learning and the data. However, there are challenges in making use of such data. For example, due to concerns and restrictions on data privacy, such as the General Data Protection Regulation (GDPR) of Europe and the Cyber Security Law of China, it may be difficult, if not impossible, to centralize data from different sources, which is typically required for traditional learning of a model related to a particular task using machine learning and the data.

Federated learning a machine learning technique, in which multiple local data owners (also referred to as clients or nodes) participate in learning a model related to a task in a collaborative manner without sharing their local training dataset with each other. Horizontal federated learning may make use of non-IID local datasets that contain horizontally partitioned data. Non-IID (where IID stands for "independent and identically distributed") means that the local datasets may have non-identical data distributions. Horizontally partitioned data means that different local datasets contain different sets of data samples that cover the same set of features. Some existing approaches for horizontal federated learning, such as federated averaging (FedAvg) or federated proximal (FedProx), are based on learning a single centralized model for all clients. Such approaches cannot customize the learned model for each client, and a learned single centralized model may not be a good fit for different non-IID local datasets. In another existing approach, referred to as federated multitask learning or MOCHA, different models may be learned for different clients; however, the MOCHA approach requires strict assumptions and simple convex models, which limit its applicability.

It would be useful to provide an approach to horizontal federated learning that can enable learning of customized models for clients holding non-IID local datasets, and also ensure data privacy.

SUMMARY

In various example embodiments, the present disclosure presents examples for implementing horizontal federated learning, in which different clients privately hold different non-IID local datasets containing horizontally partitioned data.

In various example embodiments, the present disclosure describes methods and systems that enable collaboration among clients to learn a model related to a task using machine learning and a non-iid local dataset. In particular, the collaborative learning is performed without infringing the data privacy of any client.

The present disclosure describes example embodiments which may enable clients to collaborate in learning a model related to a task using machine learning, without compromising the privacy of local datasets. In particular, collaboration may be based on similarity or clustering techniques. The disclosed example embodiments may enable customization of local models related to the same task for different clients having different non-IID local datasets. The disclosed example embodiments may be generally applicable to different types of models learned using machine learning, including both shallow models and deep models.

The present disclosure describes example embodiments in the context of federated learning, however it should be understood that disclosed example embodiments may also be adapted for implementation in the context of any distributed optimization or distributed learning systems, as well as multitask learning systems, particularly for non-IID local datasets.

In some example aspects, the present disclosure describes a computing system including a memory; and a processing device in communication with the memory. The processing device is configured to execute instructions to cause the computing system to: obtain a plurality of sets of local model parameters, each set of local model parameters having been learned at a respective client; compute, for each given set of model parameters, one or more collaboration coefficients representing a similarity between the given set of local model parameters and each other one of the sets of local model parameters; perform updating of the plurality of sets of local model parameters to obtain a plurality of sets of updated local model parameters by, for each given set of local model parameters, updating the given set of local model parameters using a weighted aggregation of the other sets of local model parameters, the weighted aggregation being computed using the one or more collaboration coefficients; and provide the sets of updated local model parameters to be sent to each respective client.

In any example embodiment, the processing device may be configured to execute instructions to cause the computing system to compute the one or more collaboration coefficients by, for each given set of local model parameters: computing a cosine similarity between the given set of local model parameters and each respective other one of the sets of local model parameters; and normalizing the cosine similarity values to obtain the respective collaboration coefficients representing the similarity between the given set of local model parameters and each respective other one of the sets of local model parameters.

In any example embodiment, the processing device may be configured to execute instructions to cause the computing system to perform updating by, for each given set of local model parameters: computing a weighted average of the other sets of local model parameters, the weighted average being the weighted aggregation; and adding the weighted average to the given set of local model parameters.

In any example embodiment, the processing device may be configured to execute instructions to cause the computing system to: generate a set of initial model parameters; and provide the set of initial model parameters to each client, to cause each client to initialize the respective local model parameters to the set of initial model parameters.

In any example embodiment, the processing device may be configured to execute instructions to further cause the computing system to obtain the plurality of sets of model parameters by: transmitting a request to an agent at each client, for a respective set of local model parameters, the respective set of local model parameters having been learned using private data at the respective client.

In any example embodiment, an iteration may be defined by: obtaining the plurality of sets of local model parameters, computing the one or more collaboration coefficients, performing updating, and providing the sets of updated local model parameters. The processing device may be configured to execute instructions to further cause the computing system to: repeat the iteration until a predefined convergence condition is satisfied.

In some example aspects, the present disclosure describes a method for horizontal federated learning. The method includes: obtaining a plurality of sets of local model parameters, each set of model parameters having been learned at a respective client; computing, for each given set of local model parameters, one or more collaboration coefficients representing a similarity between the given set of local model parameters and each other one of the sets of local model parameters; performing updating of the plurality of sets of local model parameters to obtain a plurality of sets of updated local model parameters by, for each given set of local model parameters, updating the given set of local model parameters using a weighted aggregation of the other sets of local model parameters, the weighted aggregation being computed using the one or more collaboration coefficients; and providing the sets of updated local model parameters to be sent to each respective client.

In any example embodiment, the method may include any of the steps performed by the computing system described above.

In some example aspects, the present disclosure describes a computer-readable medium having instructions stored thereon. The instructions, when executed by a processing device of a computing system, cause the computing system to: obtain a plurality of sets of model parameters, each set of model parameters representing a respective local model learned at a respective client; calculate, for each given set of model parameters, one or more collaboration coefficients representing a similarity between the given set of model parameters and each other one of the sets of model parameters; perform updating of the plurality of sets of model parameters to obtain a plurality of sets of updated model parameters by, for each given set of model parameters, updating the given set of model parameters using a weighted aggregation of the other sets of model parameters, the weighted aggregation being calculated using the one or more collaboration coefficients; and provide the sets of updated model parameters to be sent to each respective client.

In any example embodiment, the computer-readable medium may include instructions to cause the computing system to perform any of the steps described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In example embodiments disclosed herein, methods and systems are described that enable real-world application of horizontal federated learning, using non-IID local datasets. Some example embodiments of the disclosed approach may be referred to as non-IID horizontal federated learning (NHFL); more generally the example embodiments described herein may be referred to as simply horizontal federated learning. The example embodiments disclosed herein may enable implementation of horizontal federated learning, using non-IID local datasets. Data security may be maintained, together with customization of learned models for non-IID datasets, collaboration among non-IID datasets, and relatively high generality. To assist in understanding the present disclosure, FIG. 1 is first discussed.

Figure 1:
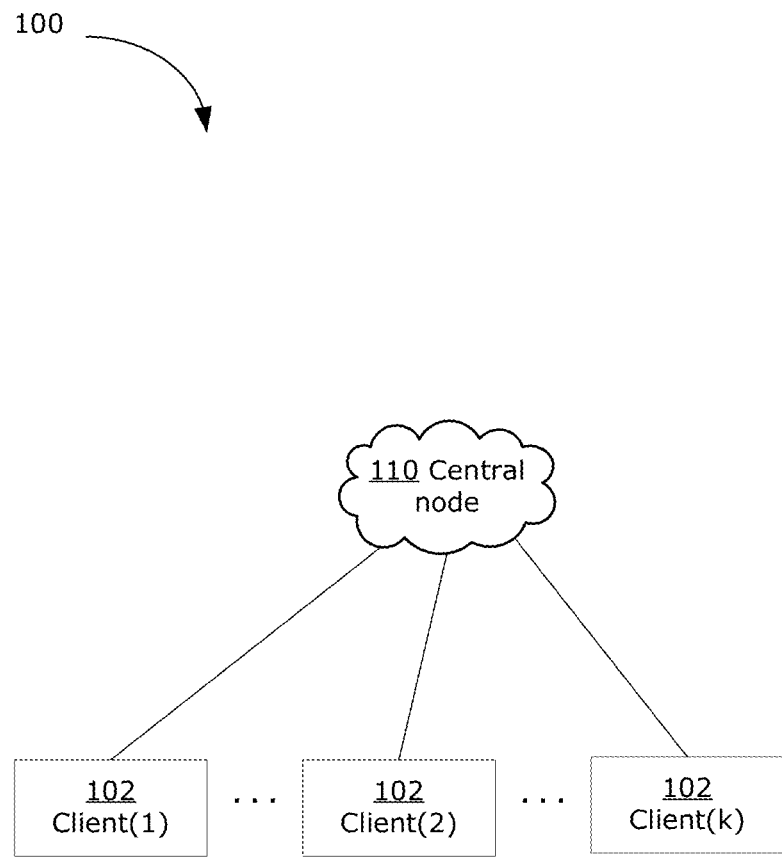
FIG. 1 is a block diagram of an example system that may be used to implement federated learning.

FIG. 1 illustrates an example system 100 that may be used to implement examples of horizontal federated learning, using non-IID local datasets, as discussed herein. The system 100 has been simplified in this example for ease of understanding; generally, there may be more entities and components in the system 100 than that shown in FIG. 1.

The system 100 includes a plurality of clients 102, each of which collect and store respective sets of local data (also referred to as local datasets). Each client 102 can run a supervised machine learning algorithm to update parameters of a local model using a set of local data (i.e. local dataset). For example, each client 102 can run a supervised machine learning algorithm to learn the weights of a neural network that approximates the model. For the purposes of the present disclosure, running a machine learning algorithm at a client 102 means executing computer-readable instructions of a machine learning algorithm to update parameters of a local model. For generality, there may be k clients 102 (k being any integer larger than 1) and hence k local datasets. The local datasets are typically non-IID datasets (IID meaning "independent and identically-distributed"), meaning the local datasets are unique and distinct from each other, and it may not be possible to infer the characteristics or distribution of any one local dataset based on any other local dataset. Each client 102 may independently be an end user device, a network device, a private network, or other singular or plural entity that holds private data. In the case where a client 102 is an end user device, the client 102 may be or may include such devices as a client device/terminal, user equipment/device (UE), wireless transmit/receive unit (WTRU), mobile station, fixed or mobile subscriber unit, cellular telephone, station (STA), personal digital assistant (PDA), smartphone, laptop, computer, tablet, wireless sensor, wearable device, smart device, machine type communications device, smart (or connected) vehicles, or consumer electronics device, among other possibilities. In the case where a client 102 is a network device, the client 102 may be or may include a base station (BS) (erg eNodeB or gNodeB), router, access point (AP), personal basic service set (PBSS) coordinate point (PCP), among other possibilities. In the case where a client 102 is a private network, the client 102 may be or may include a private network of an institute (e.g., a hospital or financial institute), a retailer or retail platform, a company's intranet, etc.

In the case where a client 102 is an end user device, the local data at the client 102 may be data that is collected or generated in the course of real-life use by user(s) of the client 102 (e.g., captured images/videos, captured sensor data, captured tracking data, etc.). In the case where a client 102 is a network device, the local data at the client 102 may be data that is collected from end user devices that are associated with or served by the network device. For example, a client 102 that is a BS may collect data from a plurality of user devices (e.g., tracking data, network usage data, traffic data, etc.) and this may be stored as local data on the BS.

Regardless of the form of the client 102, the data collected and stored by each client 102 as a local dataset is considered to be private (e.g., restricted to be used only within a private network if the client 102 is a private network), and it is generally desirable to ensure privacy and security of the local dataset at each client 102.

For horizontal federated learning, the local datasets stored by the respective clients 102 are horizontally partitioned. That is, each of the k local datasets contains different data samples that represent the same set of features. The data samples contained in different local datasets may or may not overlap with each other, and the distributions of the k local datasets are non-IID. It should be noted that the clients 102 may also store local datasets that are not horizontally partitioned, however a local dataset that is not horizontally partitioned across multiple clients 102 may not be considered in horizontal federated learning.

To learn an effective model related to a task using horizontally partitioned data during training, a conventional (non-federated learning) method gathers the local datasets from all the clients 102 and use an aggregated dataset (created by collecting the data samples of all local datasets) to learn a single central model. However, gathering the local datasets from all clients 102 in this way compromises the data privacy of all the clients 102.

In contrast, in horizontal federated learning none of the clients 102 exposes their respective local dataset or the parameters of their local model (hereinafter referred to as local model parameters) to each other. Instead, the clients 102 collaborate to learn a single global model related to a task with comparable performance to the conventional learned model related to the task.

In the example of FIG. 1, the clients 102 communicate with a central node 110. The communication between each client 102 and the central node 110 may be via any suitable network (e.g., the Internet, a P2P network, a WAN and/or a LAN) and may be a public network.

The central node 110 may be implemented using one or multiple servers, although a single server is discussed below as an example of the central node 110. It should be understood that the central node 110 may include a server, a distributed computing system, a virtual machine, or a container (also referred to as a docker container or a docker) running on an infrastructure of a datacenter, infrastructure (e.g., virtual machines) provided as a service by a cloud service provider, among other possibilities. Generally, the central node 110 (including the horizontal federated learning system 200 discussed further below) may be implemented using any suitable combination of hardware and software, and may be embodied as a single physical apparatus (e.g., a server) or as a plurality of physical apparatuses (e.g., multiple machines sharing pooled resources such as in the case of a cloud service provider). As such, the central node 110 may also generally be referred to as a computing system or processing system. The central node 110 may be used to enable collaborative federated learning, as discussed further below. The central node 110 may implement techniques and methods as described herein.

Figure 2:
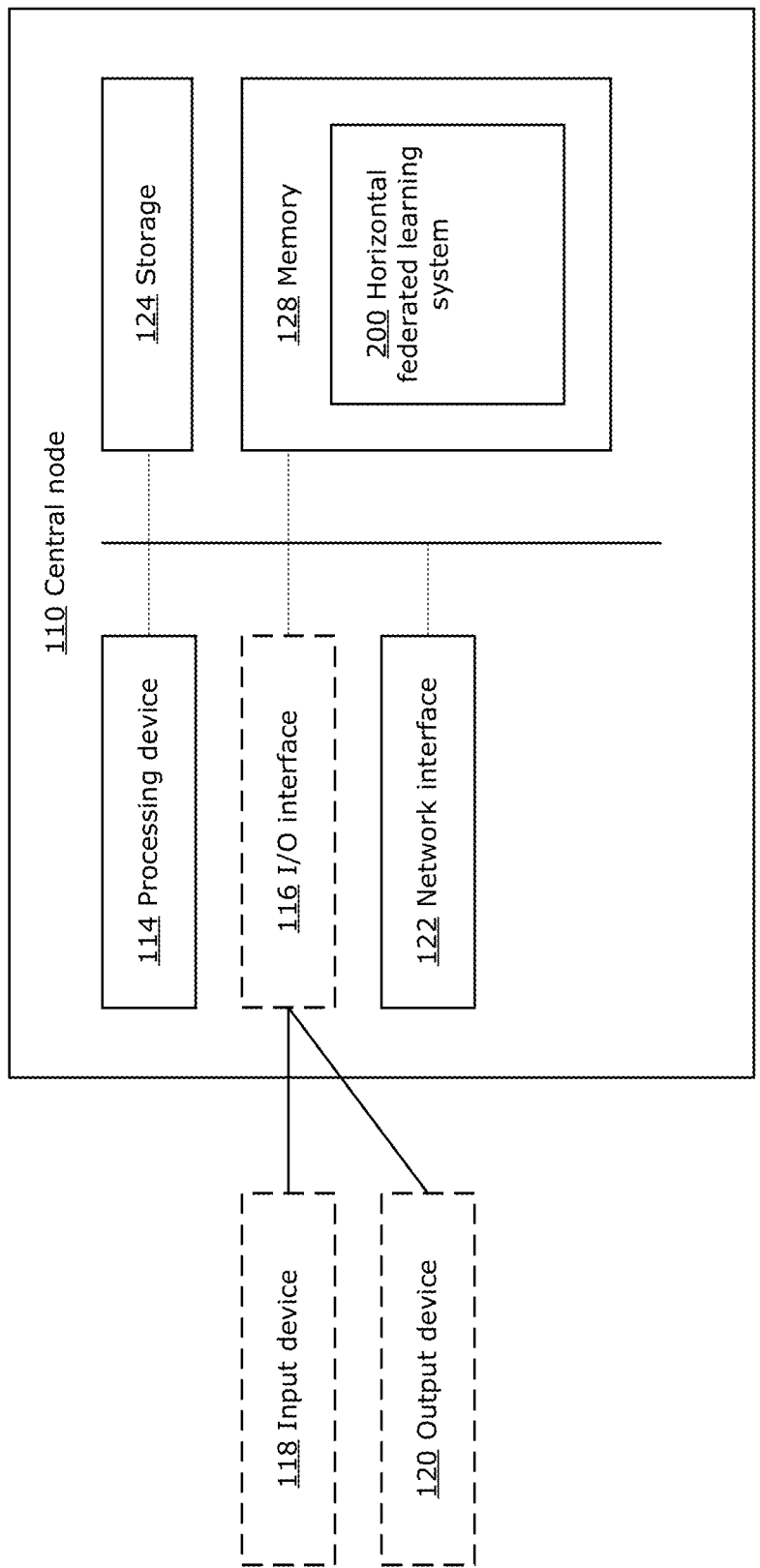
FIG. 2 is a block diagram of an example computing system that may be used to implement example embodiments described herein.

FIG. 2 is a block diagram illustrating a simplified example implementation of the central node 110 in the form of a server (e.g., a cloud server). Other examples suitable for implementing embodiments described in the present disclosure may be used, which may include components different from those discussed below. Although FIG. 2 shows a single instance of each component, there may be multiple instances of each component in the central node 110.

The central node 110 (e.g., embodied as a server) may include one or more processing devices 114, such as a processor, a microprocessor, a digital signal processor, an application-specific integrated circuit (ASIC), a field-programmable gate array (FPGA), a dedicated logic circuitry, a dedicated artificial intelligence processor unit, a tensor processing unit, a neural processing unit, a hardware accelerator, or combinations thereof. The central node 110 may also include one or more optional input/output (I/O) interfaces 116, which may enable interfacing with one or more optional input devices 118 and/or optional output devices 120.

In the example shown, the input device(s) 118 (e.g., a keyboard, a mouse, a microphone, a touchscreen, and/or a keypad) and output device(s) 120 (e.g., a display, a speaker and/or a printer) are shown as optional and external to the server. In other example embodiments, there may not be any input device(s) 118 and output device(s) 120, in which case the I/O interface(s) 116 may not be needed.

The central node 110 (e.g., embodied as a server) may include one or more network interfaces 122 for wired or wireless communication with the network 104, the nodes 102, or other entity in the system 100. The network interface(s) 122 may include wired links (e.g., Ethernet cable) and/or wireless links (e.g., one or more antennas) for intra-network and/or inter-network communications.

The central node 110 (e.g., embodied as a server) may also include one or more storage units 124, which may include a mass storage unit such as a solid state drive, a hard disk drive, a magnetic disk drive and/or an optical disk drive.

The central node 110 (e.g., embodied as a server) may include one or more memories 128, which may include a volatile or non-volatile memory (e.g., a flash memory, a random access memory (RAM), and/or a read-only memory (ROM)). The non-transitory memory(ies) 128 may store instructions for execution by the processing device(s) 114, such as to carry out example embodiments described in the present disclosure. The memory(ies) 128 may include other software instructions, such as for implementing an operating system and other applications/functions. In some example embodiments, the memory(ies) 128 may include software instructions for execution by the processing device 114 to implement a federated learning system 200 (for performing FL), as discussed further below. In some example embodiments, the server may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Some background discussion of horizontal federated learning is now provided. Typically, horizontal federated learning involves multiple rounds of training to learn a global model (i.e. learn parameters of a global model) related to a task, each round involving communication between the central node 110 and the clients 102. An example single round of training is now described. Each client 102 sends an update to the central node 110, where the update includes the local model parameters of its local model or a gradient (i.e. the difference between the learned local model parameters and the previously received parameters of the global model). The local model at each client 102 is related to the same task as the global model. At the central node 110, the received updates are aggregated in some fashion, and the parameters of the global model are updated based on the aggregated local model parameters. The updated parameters of the global model are then sent back to each client 102. Each client 102 then initializes its local model parameters to those of the updated global model, and learns an update to their respective local model parameters using its local dataset and a machine learning algorithm. The rounds of training may continue until a convergence condition is satisfied. The convergence condition may be satisfied, for example, when the number of training rounds has met or exceeded a predefined (e.g., defined by an administrator of the central node 110) threshold number. In another example, a convergence condition may be satisfied when the global model from a previous round and the global model updated in the current round of training are sufficiently close to each other (e.g., change between the global models of the previous and current round of training is smaller than a predefined percent or difference). In another example, a convergence condition may be satisfied if the 2-norm of the gradient is within a predefined threshold (e.g., if updates are a gradient). Typically, in the case where the local and global models related to the task are approximated using a deep neural network the 2-norm of gradients may not be used as a convergence condition. Instead, a predefined number of iterations may be used as a convergence condition (i.e., the training should stop after a certain number of iterations).

In some example embodiments, only a subset (e.g., 10%) of all available clients 102 is selected for each round of training. The selection may be performed randomly for each round of training.

Different approaches may be used at the central node 110 for aggregating the updates received from the clients 102. One such approach is referred to as federated averaging (or more simply "FedAvg") and is described, for example, by McMahan et al. ("Communication-efficient learning of deep networks from decentralized data," AISTATS, 2017). In the FedAvg approach, the central node 110 receives updates from each respective client 102 that include the local model parameters its respective client and aggregates the received local model parameters by averaging all local models parameters together and generates an updated global model that includes global parameters that have been updated using the averaged local model parameters. The updated global parameters of the updated global model are then sent to each of the clients 102. Each client 102 initializes the parameters of its local model to the received updated global parameters of the updated global model, and learns an update to the local model parameters using its respective local dataset and a machine learning algorithm, and communicates an update that includes the respective learned local model parameters back to the central node 110. When the convergence condition is satisfied, the final averaged model is sent to and used by all clients 102. In the FedAvg approach, all clients 102 collaboratively learn a single global model related to a task during training, and a copy of the single global model related to the task is deployed to all clients 102 (after convergence) and used by all clients 102 for prediction. A drawback of the FedAvg approach to horizontal federated learning is that the global parameters (which were updated using the averaged local model parameters) of the global model may not be a good fit for all clients 102, when the local datasets are non-IID. The FedAvg approach results in a single global model being used by all clients 102, which means there is no ability to customize the single global model related to the task according to the local dataset of each client 102. This may result in further performance degeneration.

Another approach that may be used is referred to as federated proximal (or more simply "FedProx"), which is described, for example, by Li et al. ("Federated optimization in heterogeneous networks," SysML 2020). Similar to FedAvg, in the FedProx approach an updated global model (that includes global parameters that have been updated using the averaged local model parameters) is generated at the central node 110 by averaging all local model parameters received from the clients 102. Each client 102 initializes the parameters of its local model to the received average model parameters of the global model, and learns an update to the local model parameters using its respective local dataset and a machine learning algorithm, but with an added proximity constraint that the updated local model parameters should be similar to the global model parameters. When the convergence condition is satisfied, the final model parameters of the update global model are sent to and used by all clients 102 for prediction. Similar to the FedAvg approach, the FedProx approach results in a single global model that includes the global model parameters that is to be used by all clients 102 for prediction. The drawbacks of the FedPox approach may thus be similar to those discussed above for the FedAvg approach.

Another approach to horizontal federated learning is referred to as federated multitask learning (or "MOCHA"), which is described, for example, by Smith et al. ("Federated multi-task learning," In Advances in Neural Information Processing Systems (NeurIPS), pp. 4424-4434, 2017). MOCHA is based on the use of dual variables for updating models. In each round of training, instead of each client 102 sending an update that includes local model parameters of its local model to the central node 110, each client 102 sends a dual variable of its respective locally updated model to the central node 110. Using the received dual variables, the central node 110 estimates the relationship between the models of different clients 102, and then updates the dual variables corresponding to each client 102. The updated dual variables are then transmitted to each corresponding client 102. Each client 102 performs local updating of its respective dual variable using its respective local dataset. When the convergence condition is satisfied, the dual variables are collected by the central node 110 from all clients 102. These dual variables are used at the central node 110 to recover the respective local model of each client 102. Each client 102 may then use its respective local model as recovered by the central node 110. Although the MOCHA approach may enable the local model at each client 102 to be better customized according to each local dataset, the MOCHA approach may be limited in its use. For example, the MOCHA approach requires certain strict assumptions to be made, and is designed to work with simple convex models. It may not be possible to apply the MOCHA approach to other applications, such as for training deep neural networks.

In example embodiments described herein, an approach to horizontal federated learning is described, which may help to address at least some of the above-noted challenges and/or drawbacks. In some example embodiments, a non-IID horizontal federated learning (NHFL) system is described that may help to maintain data privacy of each client 102, and still enable collaboration (at the central node 110) in learning a model using machine learning related to a task. The described example embodiments may enable each client 102 to learn its own respective local model related to the same task (rather than a single global model related to the task that is used by all clients 102), which may better fit its respective non-IID local dataset and hence may result in better performance (e.g., higher accuracy) of the learned local model. The collaboration during training, which is managed at the central node 110, may enable local models related to the same task learned at different clients 102 to learn from each other, based on similarity and/or clustering of local models, for example. The disclosed example embodiments may be generally applicable to training to learn various types of models using machine learning, including both shallow models and deep models.

To assist in understanding the present disclosure, some notation is introduced. k is the number of clients 102 participating in a given round of training. Although the number of clients 102 participating in a given round of training may change from round to round, for simplicity it will be assumed that k clients 102 participate in a current round of training, without loss of generality. The set of training data that is used to perform an update of the set of local model parameters of local model at the j-th client 102 is denoted as $X_j$ (where j, in general, is some integer between 1 and k, inclusively). It should be noted that the set of training data $X_j$ is not necessarily all of the available data samples of the local dataset that is suitable for learning the local model parameters of the local model during training at the j-th client 102. In the case where full-batch training method is performed, then $X_j$ is all available suitable data samples at the j-th client 102. In the case where stochastic training methods are performed, for example, $X_j$ may be a set of data samples that is randomly sampled from the available suitable data samples at the j-th client 102. The set of training data $X_j$ is used to learn the local model parameters of the local model (also referred to as model(j) or the j-th model) at the j-the client 102. The set of local model parameters (e.g., weights of a neural network) of the local model(j) stored at the j-th client 102 is denoted as $\theta_j$. The set of local model parameters $\theta_j$ includes all the parameters of the local model(j). Mathematically, the local model(j) (also referred to as the private model(j)) at the j-th client 102 may be denoted as $g_j(X_j|\theta_j)$, to indicate that the local model(j) is dependent on the set of training data $X_j$ and the set of model parameters $\theta_j$.

Figure 3:
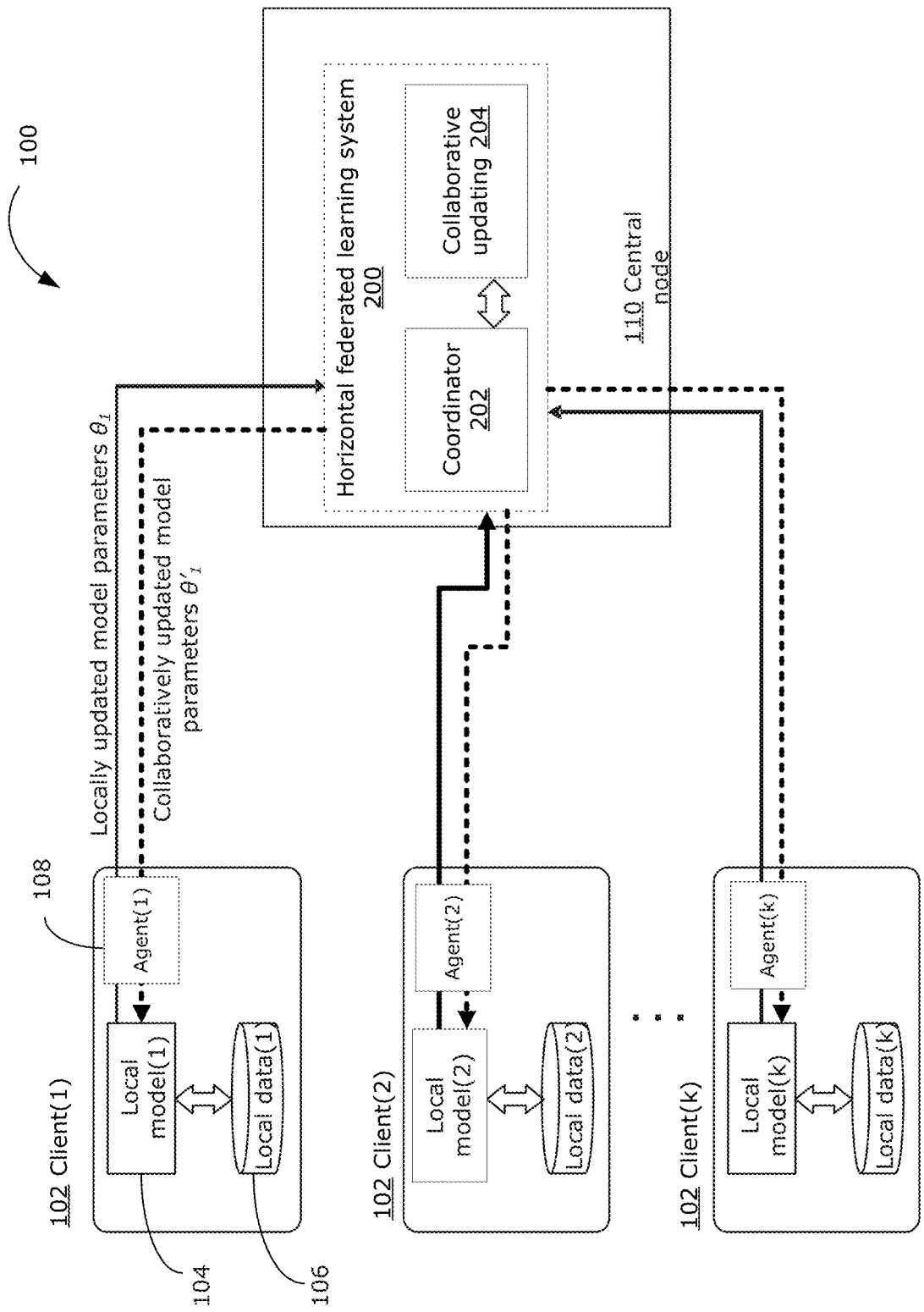
FIG. 3 is a block diagram illustrating an example implementation of a horizontal federated learning system, for example in the system of FIG. 1.

FIG. 3 is a block diagram illustrating more details of the system 100, including details that may be used to implement the horizontal federated learning system 200 in the central node 110. For simplicity, the central node 110 has been illustrated as a single server (e.g., as shown in FIG. 2). However, it should be understood that the central node 110 may actually be a virtual server or virtual machine that is implemented by pooling resources among a plurality of physical servers, or may be implemented using a virtual machine or container (also referred to as a docker container or a docker) within a single physical server, among other possibilities.

For simplicity, each client 102 is shown as having similar configuration. However, it should be understood that different clients 102 may have different architectures. For example, one client 102 may store multiple different local models and/or may have access to multiple different local datasets. As shown, each client 102 hosts a respective local model 104, respective set of local data 106 (also referred to as the local dataset 106) and a respective agent 108. In some example embodiments, the local model 104, local dataset 106 and agent 108 may be held by a respective client 102 within a virtual machine or container (e.g., in the case where the client 102 is a private network). As previously mentioned, each client 102 may have different configurations independent from each other, and some clients 102 may make use of a container while other clients 102 may not.

The local dataset 106 of different clients 102 are horizontally partitioned. The local model 104 of each client 102 may have full access to the respective local dataset 106 of each client 102. The local model 104 of each client 102 is related to the same task. The agent 108 at each client 102 manages the transmission of information to the central node 110 and the receipt of information from the central node 110, to enable each client 102 to participate in collaborative learning of local models 104 related to the task during training. The agent 108 may manage all communications between the respective client 102 and the coordinator 202 at the central node 110. In particular, the agent 108 may help to ensure that none of the respective local datasets 106 is transmitted out from the respective client 102, or is accessed by any entity outside of the client 102.

In this example, there is no communication or interaction between different clients 102. The agent 108 at each client 102 may only be used during a training phase (i.e. during training), when each client 102 learns its respective local model 104 (i.e. learns the set of local model parameters of its respective local model 104). After the training phase is completed (e.g., after the convergence condition has been satisfied), the agent 108 may no longer be required, and there may not be any further communication between each client 102 and the central node 110. Also, after the training phase is completed, the local models 104 may be used for prediction during an inference phase. Further discussion of the inference phase is provided further below.

Collaborative learning is conducted using the horizontal federated learning system 200 at the central node 110. The central node 110 does not have access to nor receives any local datasets 106 from clients 102. In this example, the horizontal federated learning system 200 includes a coordinator 202 and a collaborative updating block 204. The coordinator 202 serves to coordinate communications with clients 102 during the training, including receiving sets of local model parameters from each client 102 and transmitting updated model parameters to each client 102. The collaborative updating block 204 serves to perform group-wise collaborative updates, as discussed further below.

The federated learning system 200 may be implemented using software (e.g., instructions for execution by the processing device(s) 114 of the central node 110), using hardware (e.g., programmable electronic circuits designed to perform specific functions), or combinations of software and hardware. Although the federated learning system 200 is illustrated and described with respect to blocks 202, 204, it should be understood that this is only for the purpose of illustration and is not intended to be limiting. For example, the federated learning system 200 may not be functionally split into blocks 202, 204, and may instead be implemented as a single block or single overall function. Further, functions that are described as being performed by one of the blocks 202, 204 may instead be performed by the other of the blocks 202, 204.

Figure 4:
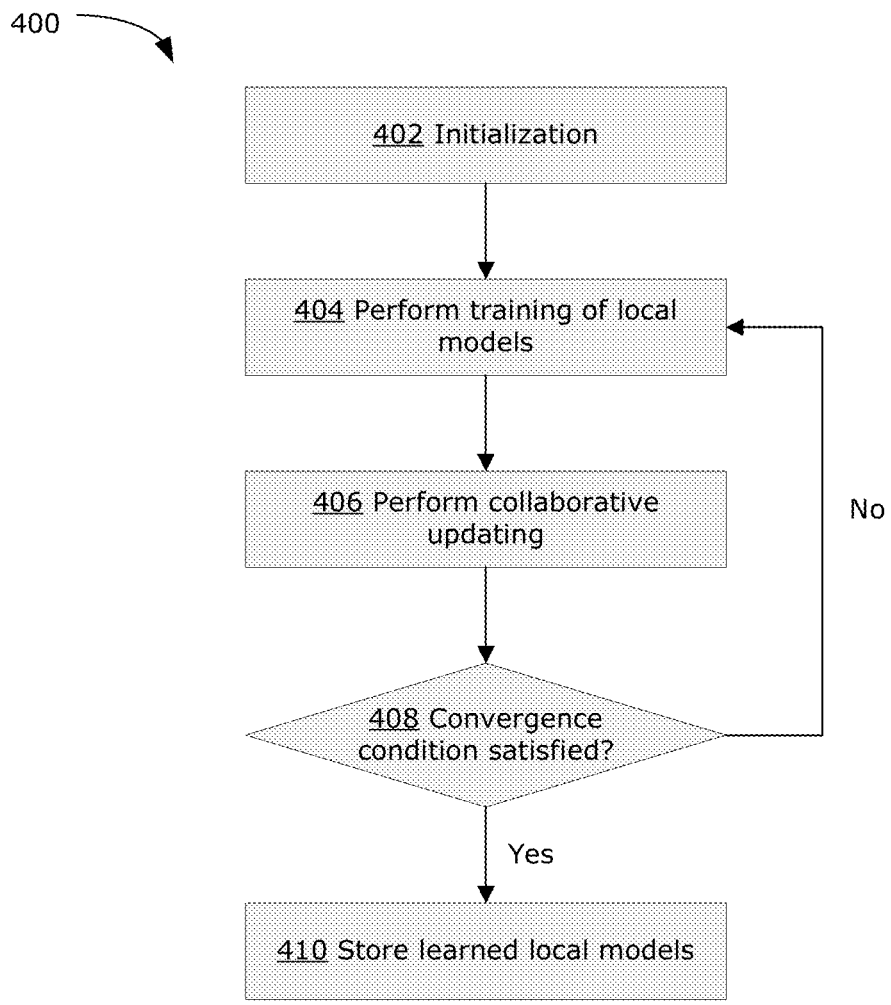
FIG. 4 is a flowchart illustrating an example method for performing horizontal federated learning, for example in the system of FIG. 3.

FIG. 4 is a flowchart illustrating an example method 400 that may be performed by the system 100, for the training phase. Steps of the method 400 is performed variously by the clients 102 and the central node 110. FIG. 4 provides a general overview of the training phase (i.e. training of the local models 104 to learn the set of local model parameters of the local models 104), and further details are illustrated in additional figures discussed further below.

At 402, initialization is performed. Initialization may be defined as the start of training, and the start of all training rounds. Initialization may be performed by the horizontal federated learning system 200 at the central node 110. For example, the horizontal federated learning system 200 may collect (via communication between the coordinator 202 and the agents 108) information from all clients 102 about the model structure of the respective local models 104. The horizontal federated learning system 200 generates a set of initial model parameters θ, for example by initially setting the value of each parameter in the set of initial model parameters θ to a respective random value. The set of initial model parameters θ is transmitted to all clients 102. In some example embodiments, the horizontal federated learning system 200 may also send notification to each client 102 to cause initialization of the respective local model 104 using the set of initial model parameters θ. Each client 102, after receiving the set of initial model parameters θ, initializes its respective local model 104 using the received set of initial model parameters θ. That is, the result of initialization is that the k local models 104 held by the k clients 102 all have the same model parameters:

$$\theta_1 = \theta_2 = \ldots = \theta_k = \theta$$

At 404, each client 102 performs training of the respective local model 104 to learn an update to its set of local model parameters using the respective local dataset 106 and a machine learning algorithm. That is, the j-th client 102 uses the set of training data $X_j$ (which may be all of or a subset of the local dataset 106) to train the local model(j) to learn an update to its set of local model parameters $\theta_j$. The training may be performed by each client 102 for a defined number of epochs, which may or may not be the same across all clients 102.

At 406, the horizontal federated learning system 200 at the central node 110 collects the sets of local model parameters $\theta_1, \ldots, \theta_k$ from all k clients 102. For example, the coordinator 202 may send a request to each agent 108 to obtain the set of local model parameters $\theta_1, \ldots, \theta_k$ (e.g., as indicated by solid black arrows shown in FIG. 3) from each of the k clients 102. The horizontal federated learning system 200 (e.g., using the collaborative updating block 204) performs collaborative updating to generate sets of updated local model parameters $\theta'_1, \ldots, \theta'_k$. Details of collaborative updating are discussed further below. Each set of updated local model parameters is transmitted by the central node 110 back to a corresponding client 102 from which the set of local model parameters $\theta_1, \ldots, \theta_k$, was received (e.g., via the respective agent 108, as indicated by dotted arrows shown in FIG. 3).

At 408, a determination is made whether a predefined convergence condition (e.g., any suitable convergence condition as discussed previously) has been satisfied. The determination whether the convergence condition is satisfied may be performed by the central node 110, or in some cases may be performed by individual clients 102. If the convergence condition is not satisfied, the method 400 may return to step 404 to perform another round of training. If the convergence condition is satisfied, the method 400 may proceed to step 410. Typically, the determination of convergence is performed by the central node 110. After determining that the convergence condition is satisfied, the central node 110 may notify each client 102 that the training phase is ended.

If the determination of convergence is made by individual clients 102, it is possible that some clients 102 determine that the convergence condition is satisfied and other clients 102 determine that the convergence condition is not satisfied (e.g., in the case where different clients 102 have different predefined convergence conditions). In such cases, clients 102 that determine the convergence condition is satisfied may simply cease to participate in further training rounds, and the method 400 returns to step 404 with a reduced number of clients 102.

At 410, each client 102 stores the respective trained local model 104 that includes the respective set of collaboratively updated local model parameters received from the horizontal federated learning system 200 at the central node 110). The trained local model 104 may then be deployed for prediction in an inference phase.

Further details of collaborative updating is now described. Although the local datasets 106 at different clients 102 are non-IID, in practice it may be expected that there is some similarity in local datasets 106 (e.g., based on similarity of geographical location, demographic, etc. associated with the clients 102). Thus, it may be reasonable to expect that some grouping or clustering of local datasets 106 is possible. Local models 104 that are learned using similar local datasets 106 should be similar to each other, and it would be beneficial to leverage this similarity to enable the similar local models 104 to collaboratively learn from each other. However, because of the non-IID nature of the local datasets 106, the technique that is used for enabling collaborative learning is not trivial, so that collaboration between more similar models is promoted and collaboration between less similar models is discouraged. In particular, simply averaging all local models together would not result in beneficial collaboration.

Figure 5:
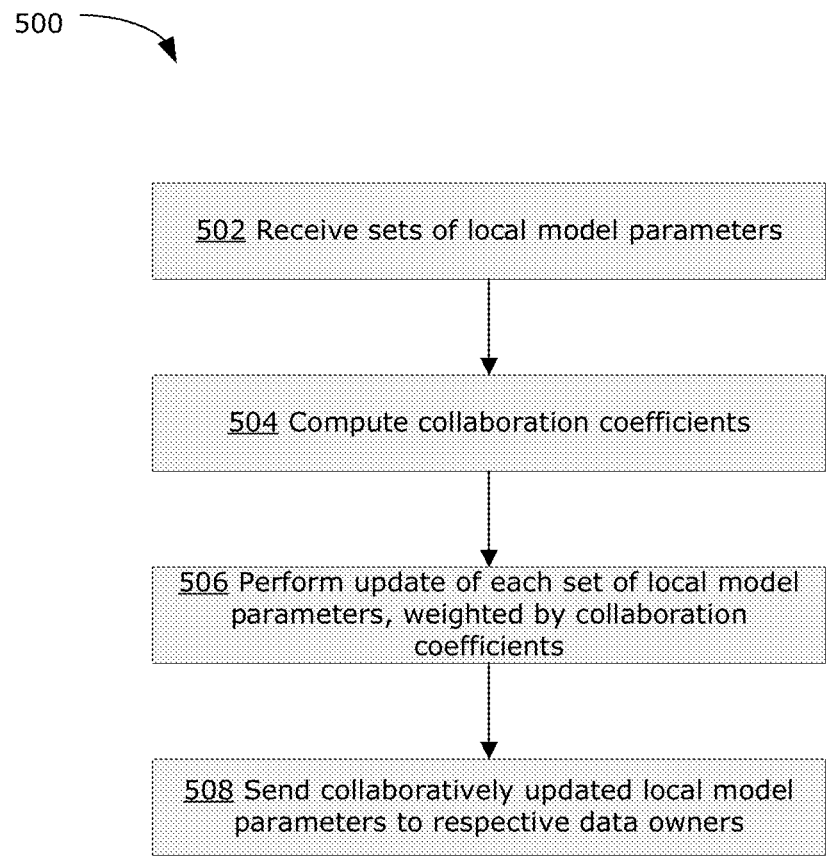
FIG. 5 is a flowchart illustrating an example method for performing collaborative updating, for example in the horizontal federated learning system shown in FIG. 3.

FIG. 5 is a flowchart illustrating details of an example method 500 for performing collaborative updating. The method 500 may be performed by the horizontal federated learning system 200, for example using the collaborative updating block 204.

At 502, the sets of local model parameters $\theta_1, \ldots, \theta_k$ are received from all clients 102 (e.g., via communication between the coordinator 202 and the respective agents 108).

At 504, collaboration coefficients are computed. The collaboration coefficients will be used, at subsequent step 506, to perform weighted updating of each set of local model parameters. The collaboration coefficients may be considered to be a numerical or mathematical representation of the similarity between different sets of local model parameters. In particular, the collaboration coefficients may represent pair-wise similarity between pairs of sets of local model parameters. For a first set of the sets of local model parameters, collaboration coefficients may be calculated to represent similarity between the first set of local model parameters and each other set of local model parameters (of the total k sets of local model parameters received at step 502). The collaboration coefficient between a first set and a second set of the sets of local model parameters may be used to control how much influence the second set of local model parameters will effect on the updating of the first set of local model parameters, and vice versa.

For example, for a given pair of sets of local model parameters $\theta_i$ and $\theta_j$, a pair-wise collaboration coefficient $\alpha_{ij}$ may be calculated. A higher value for the collaboration coefficient $\alpha_{ij}$ may indicate a greater similarity between the sets of local model parameters $\theta_i$ and $\theta_j$, whereas a lower value for the collaboration coefficient $\alpha_{ij}$ may indicate a lower similarity between the sets of local model parameters $\theta_i$ and $\theta_j$. It should be noted that the range and meaning of the value of a given collaboration coefficient may depend on the technique used to compute the collaboration coefficients. For example, it may be possible (depending on the computation technique) that a higher value for the collaboration coefficient indicates a lower similarity and a lower value for the collaboration coefficient indicates a greater similarity.

An example technique for computing the collaboration coefficients is based on the pair-wise cosine similarity between all the sets of local model parameters. The pair-wise cosine similarity is computed by pairing each set of local model parameters with each one of all other sets of local model parameters (for a total of k×k pairs), and calculating the pair-wise cosine similarity as follows:

$$s_{ij} = \cos(\theta_i, \theta_j)$$

where $s_{ij}$ is the cosine similarity between the set of local model parameters $\theta_i$ and the set of local model parameters $\theta_j$, where $1 \le i, j \le k$. A value of 1 for the cosine similarity $s_{ij}$ indicates the highest level of similarity between the set of local model parameters $\theta_i$ and the set of local model parameters $\theta_j$ (e.g., that the two sets of local model parameters are identical). A value of 0 for the cosine similarity $s_{ij}$ indicates the lowest level of similarity between the set of local model parameters $\theta_i$ and the set of local model parameters $\theta_j$ (e.g., that the vectors formed by the sets of local model parameters are perpendicular to each other).

The collaboration coefficient $\alpha_{ij}$ between the set of local model parameters $\theta_i$ and the set of local model parameters $\theta_j$ may then be computed as:

$$\alpha_{ij} = e^{s_{ij}} / \Sigma_j e^{s_{ij}}$$

This computation may be performed in order to convert the cosine similarity values to normalized collaboration coefficients that may be more suitable for computing a weighted aggregation later. Other techniques may be used to compute the collaboration coefficients between pairs of sets of local model parameters. For example, suitable clustering techniques may be used to group the sets of model parameters $\theta_1, \ldots, \theta_k$ into clusters, and the collaboration coefficient $\alpha_{ij}$ between the set of local model parameters $\theta_i$ and the set of local model parameters $\theta_j$ may be computed as the distance between the set of local model parameters $\theta_i$ and the centroid of the cluster to which the set of local model parameters $\theta_i$ belongs. In another possible approach, the collaboration coefficient $\alpha_{ij}$ between the set of local model parameters $\theta_i$ and the set of local model parameters $\theta_j$ may be computed as a simple Euclidean distance between the two sets of local model parameters. Any other technique for representing similarity between a pair of sets of local model parameters $\theta_i$ and $\theta_j$ may be used for computing the collaboration coefficient $\alpha_{ij}$.

At 506, each set of local model parameters is updated using an aggregation of the other sets of local model parameters, weighted by the corresponding collaboration coefficient. That is, for a first set of local model parameters, the pair-wise collaboration coefficient between the first and a second set of local model parameters is used to weight the effect of the second set of local model parameters on the updating of the first set of local model parameters. Mathematically, this may be represented as:

$$\theta'_i \leftarrow \sum_j \alpha_{ij} \theta_j$$

where the symbol ← indicates an updating procedure to update the i-th set of local model parameters $\theta_i$, $\theta'_i$ denotes the i-th set of updated local model parameters (to differentiate from the i-th set of local model parameters $\theta_i$ originally received from the i-th client), and $\Sigma_j \alpha_{ij} \theta_j$ may be conceptually thought of as a weighted aggregation (or weighted average) of all other sets of local model parameters. The updating procedure may be simply using the weighted average to replace the i-th set of local model parameters $\theta_i$.

This collaborative updating is performed for all model parameters $\theta_1, \ldots, \theta_k$, to obtain k sets of updated local model parameters $\theta'_1, \ldots, \theta'_k$.

At 508, each set of updated local model parameters is transmitted to the respective client 102. For example, the coordinator 202 may, using some identifying metadata (e.g., a tag or identifier originally associated with each set of local model parameters received from the clients 102) associated with a given set of updated local model parameters, may identify the client 102 (or the agent 108 corresponding to that client 102) for the given set of updated local model parameters.

After receiving the updated local model parameters, each client 102 may update their own respective local model 104 using the set of updated local model parameters. Each client node 102 updates its own respective model 104 by initializing the set of local model parameters $\theta_i$ of the local model 104 to the set of updated local model parameters $\theta'_i$. If the convergence condition has been satisfied, the local model 104 is trained (e.g. includes a set of learned local model parameters) and may then be deployed for the prediction during an inference phase.

In the collaborative updating described above, group-wise collaboration may be used as the basis for updating each set of local model parameters. It should be noted that it may not be necessary to explicitly form groups or clustering of the sets of local model parameters, and it may not be necessary to specify the number of groups to form. For example, the computation of cosine similarity as discussed above may be considered an implicit grouping of sets of local model parameters based on similarity. Sets of local model parameters that have high similarity with each other (or that are grouped together) indicate that the data distribution of the respective local datasets (on which the local models were learned) are similar as well. Such similar local models are expected to benefit from strong collaboration with each other. For example, attention-based averaging may be used between local models such that more similar local models have stronger weight sharing effect.

Figure 6B:
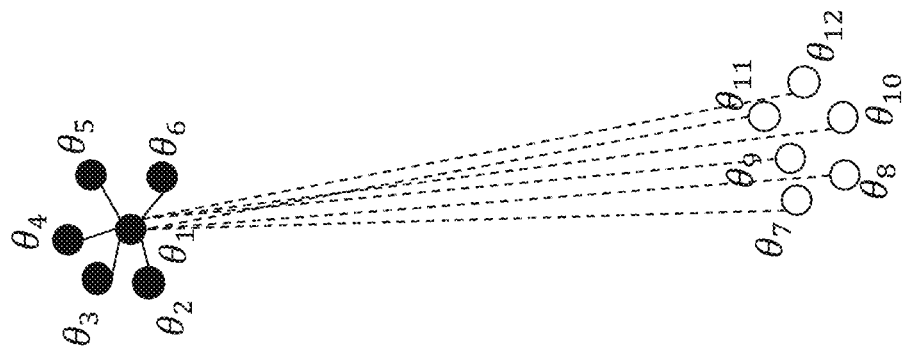
FIGS. 6A and 6B illustrate an example of grouping or clustering of learned models over multiple rounds of training.
Figure 6A:
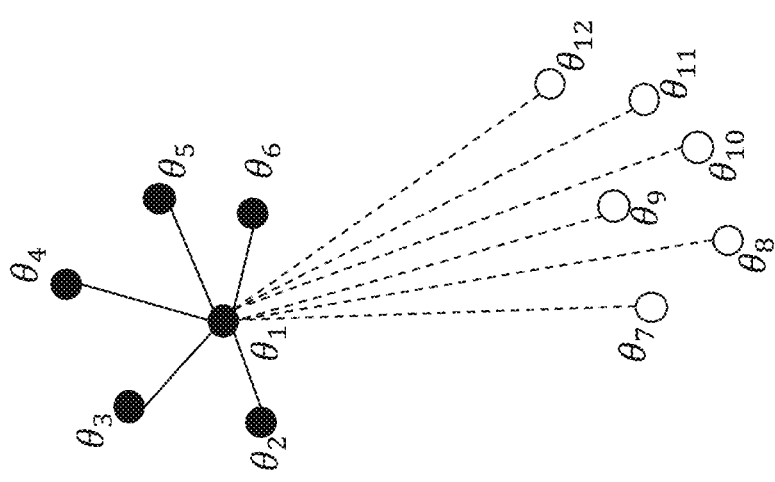

Over multiple iterations of training, the attention-based attention and group-wise collaboration discussed above may cause adaptive grouping of similar local models. FIGS. 6A and 6B show an example illustration of the concept of adaptive grouping. These figures represent 12 sets of local model parameters $\theta_1, \ldots, \theta_{12}$ as respective circles, and the similarity of each set of local model parameters of the 12 sets of local model parameters to a first set of model parameters $\theta_1$ of the 12 sets of local model parameters is represented by a solid or dotted line. The shorter the line, the greater the similarity to the first set of model parameters $\theta_1$.

FIG. 6A represents the similarity of the sets of local model parameters $\theta_1, \ldots, \theta_{12}$ before any collaborative updating is performed. Some sets of local model parameters (e.g., $\theta_2, \ldots, \theta_6$ in this example) have greater similarity to the first set of local model parameters $\theta_1$ than some other sets of local model parameters of the 12 sets of local model parameters (e.g., $\theta_7, \ldots, \theta_{12}$ in this example). In this example, the 12 sets of local model parameters $\theta_1, \ldots, \theta_{12}$ form two clusters, represented by black circles and white circles respectively. Using collaborative updating, the sets of local model parameters that belong to a given cluster, over multiple rounds of training (e.g., 10 rounds of training) become more similar to each other, as represented in FIG. 6B. As the sets of local model parameters within a given cluster become more similar to each other, greater collaboration is encouraged within the cluster.

When training (e.g. federated learning) is complete (e.g., when the convergence condition has been satisfied), the updated sets of local model parameters may be used to update the respective sets of local model parameters of local models 104 at the respective clients 102. Each client 102 may then independently use its respective trained local model 104 for prediction during inference (e.g. to make a prediction on new local data at the client 102).

Figure 7:
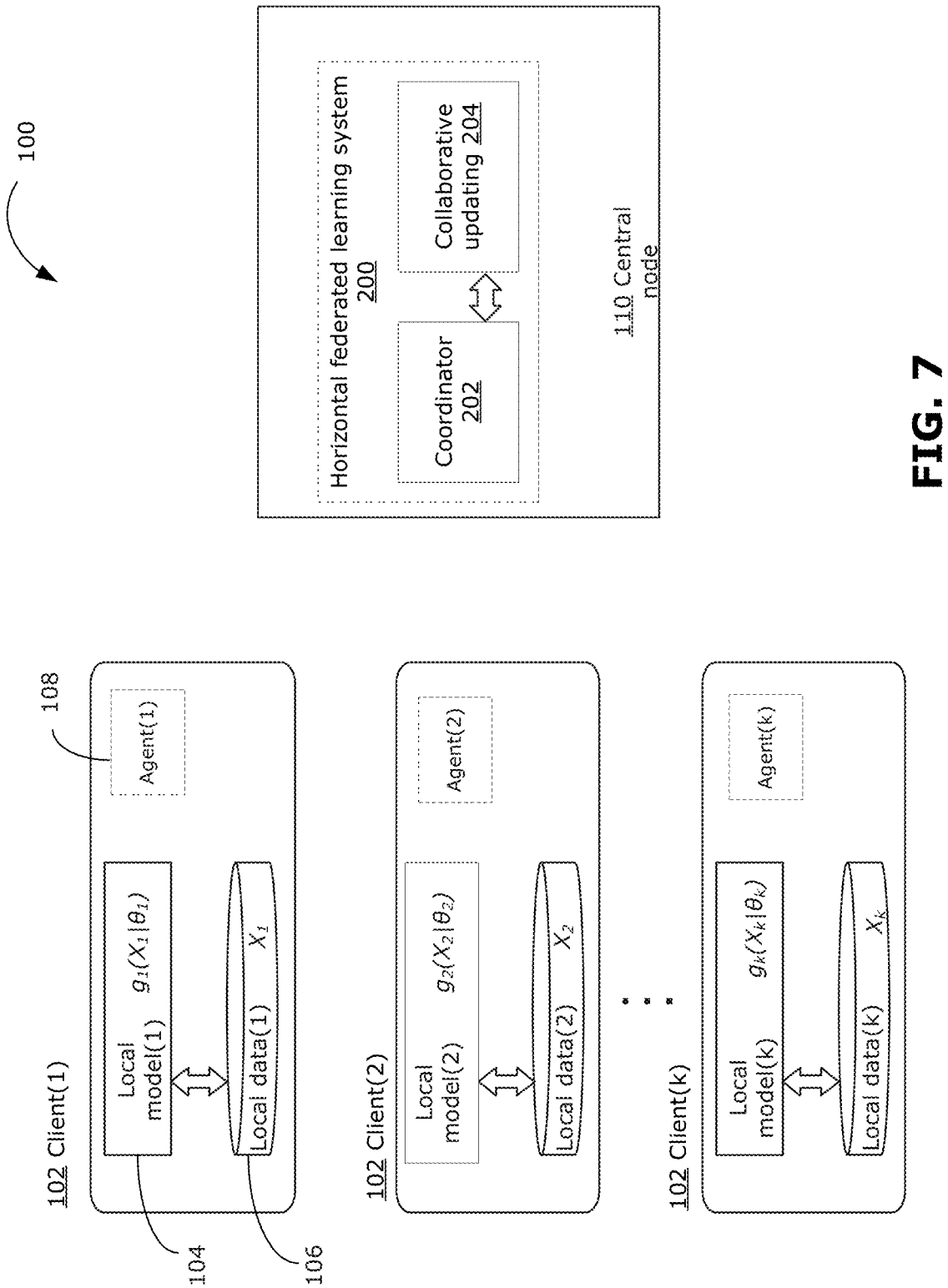
FIG. 7 is a block diagram illustrating an example configuration of the system of FIG. 3, in a prediction/inference phase.

FIG. 7 is a block diagram illustrating the system 100 that includes the trained local models that are used to make a prediction during inference. It should be noted that, although the central node 110 is shown in FIG. 7, the central node 110 may not play any role in the prediction/inference phase. Each client 102 may independently include its respective trained local model to be used for making a prediction, without communicating with the central node 110 or any other client 102. A trained local model 104 is a model that includes the set of learned local model parameters $\theta_i$ (e.g., the set of local model parameters that were updated using the updated set of local model parameters $\theta'_i$ when the training phase was completed).

The agent 108 at each client 102 may not play any role, and may be omitted or inactive when the trained local model is used for prediction. Similar to FIG. 3, each client 102 is shown as having similar configuration for simplicity. However, it should be understood that different clients 102 may have different architectures, each client 102 may be a single physical computing unit (e.g., a single device or a single server) or may be a network of devices/servers (e.g., a private network), and each client 102 may or may not use a container or virtual machine to host the respective trained local model and local data 106.

As shown in FIG. 7, after completion of the training of the local models 104 related to the same task, each client 102 has stored a respective trained local model 104. For the i-th client 102, the trained local model 104 is denoted as $g_i(X_i|\theta_i)$, indicating that the trained local model 104 has been trained using the local data $X_i$ (e.g. local dataset 106) and includes the set of learned parameters $\theta_i$. As discussed above, where the set of learned parameters $\theta_i$ have been learned using collaborative learning at the central node 110 during the training. During inference, each client 102 may use its own respective trained local model 104 to make a prediction. No interaction between clients 102 is required for a trained local model 104 to make a prediction. Some possible predictions that the trained model makes include predicting a class label, a class score, a probability, or a bounding box, among other possibilities.

Some example simulation results are discussed. It has been found that by enabling collaboration between similar local models, the disclosed approach to horizontal federated learning results in better performance than separately training a single local model for each client 102.

In a first simulation example, the data from Fashion-MNIST dataset (a dataset of 28×28 grayscale images, associated with labels '0' to '9' forming 10 classes) was used. In this simulation, 60,000 data samples were used for training and 10,000 data samples were used for testing. For the purpose of simulation, the number of clients was set at K=10, with data samples evenly distributed across the clients (such that each client holds 6,000 training data samples and 1,000 testing data samples). To simulate non-IID local data, five clients were assigned data samples representing labels '0'-'4', and the other five clients were assigned data samples representing labels '5'-'9'. Further, for each client, half of the training data samples represent a single assigned label and the remaining half of the data samples represent the other remaining four assigned labels. Thus, the majority label of each client is unique and different from the other client. The training and testing data samples of the same client followed the same data distribution.

In the example simulation, the local models learned during training related to the task of image classification and were learned using data samples held by all clients to collaboratively learn local models that perform image classification, without revealing any private data samples or local model parameters of each client. For each client, a deep neural network with two convolutional layers and two fully connected layers was used to learn the model, with the last layer producing a 10-dimensional vector as the output. The client execute a supervised machine learning algorithm to update the set of parameters (e.g. weights) of the deep neural network. The local models were trained (using the example training method discussed herein, as well as other known training methods for comparison). The trained local models were then used to make a prediction using each a testing dataset, and the accuracy of prediction was determined.

During the training phase, the training hyper parameters that were used were: 100 inner training epochs; 20 outer training iterations; batch size of 1000; and using Adam as the optimizer. Inner training epochs refer to the number of training epochs performed by each client 102, outer training iterations refer to the number of training rounds performed with collaborative updating (at the central node 110), and batch size refers to the number of data samples of the local datasets 106 randomly sampled per training round. The training methods that were compared are: the example training method discussed herein; centralized training using all local datasets (i.e., conventional non-federated learning, without data privacy); separate training of each local model using local datasets (i.e., each client performing separate and independent non-collaborative training); the FedAvg approach; and the FedProx approach. The results of the simulation found that the example disclosed training approach achieved an accuracy of 96.1%; the centralized training approach achieved an accuracy of 92.2%; the separate training approach achieved an accuracy of 95.0%; the FedAvg approach achieved an accuracy of 82.5%; and the FedProx approach achieved an accuracy of 81.8%. Thus, this first simulation found that the example approach discussed herein achieved the highest accuracy among the compared training approaches.

A second simulation example was performed, with setup similar to the first simulation example, but with a higher number of clients. In the second simulation example, 50 clients were used, such that each client holds 1,200 training data samples and 200 testing data samples. Similar training parameters were used. The results of the second simulation found that the example disclosed training approach achieved an accuracy of 95.0%; the centralized training approach achieved an accuracy of 92.2%; the separate training approach achieved an accuracy of 92.0%; the FedAvg approach achieved an accuracy of 80.2%; and the FedProx approach achieved an accuracy of 80.8%. Thus, this second simulation also found that the example approach discussed herein achieved the highest accuracy among the compared training approaches.

A third more challenging simulation was performed. To increase the challenge, the data from the extended MNIST dataset was used. The extended MNIST dataset contains a set of handwritten alphanumeric characters, in 28×28 pixel image format. The possible class labels are the digits '0' to '9', the uppercase letters 'A' to 'Z' and the lowercase letters 'a' to 'z' (thus a total of 62 different labels). In this simulation, 697,932 data samples were used for training and 116,323 data samples were used for testing. For the purpose of simulation, the number of clients was set at K=62, with each client having different numbers of training and testing data samples. Ten clients were assigned data samples representing labels '0'-'9'; 26 other clients were assigned data samples representing labels 'A'-'Z'; and the remaining 26 clients were assigned data samples representing labels 'a'-'z'. Further, for each client, half of the training data samples represent a single assigned label and the remaining half of the data samples represent the other remaining assigned labels. Thus, the majority label of each client is unique and different from the other client. The training and testing data samples of the same client followed the same data distribution.

During the training phase, the training hyper parameters that were used were: 30 inner training epochs; 5 outer training iterations; batch size of 1000; and using Adam as the optimizer. The results of the simulation found that the example disclosed training approach achieved an accuracy of 93.3%; the centralized training approach achieved an accuracy of 77.4%; the separate training approach achieved an accuracy of 88.8%; the FedAvg approach achieved an accuracy of 37.7%; and the FedProx approach achieved an accuracy of 18.1%. Thus, this third more-challenging simulation found that the example approach discussed herein achieved significant accuracy improvements compared to some known training approaches.

In various example embodiments, the present disclosure describes methods and systems for performing horizontal federated learning. The disclosed example embodiments enable collaboration among clients yet maintain data privacy of each client. Local models that are learned using the horizontal federated learning technique discussed herein may achieve relatively high accuracy performance for all clients having non-IID data distribution. Group-wise collaboration (e.g., implicitly via calculation of collaboration coefficients between pairs of sets of model parameters) is leveraged to enable collaboration among non-IID clients. Such collaboration may enable better accuracy in the performance of the trained models, compared to separately training one model for each client.

Compared to other known federated learning techniques, example embodiments discussed herein may be more generally applicable to learn various types of local models using machine learning, including both shallow models and deep models. For example, the example embodiments described herein may be used to learn various models such as logistic regression, support vector machine (SVM), decision tree and other neural network architectures.

Non-IID collaboration, as enabled in the example embodiments discussed herein, may be more efficient that some other known techniques, because a smaller number of cloud average (or cloud aggregation) is required. Because cloud average requires use of communication resources (e.g., bandwidth) to communicate between the cloud server and clients, it is generally desirable to reduce the number of cloud average.

The example embodiments disclosed herein may be relatively simple to implement, without requiring use of complicated secure arithmetic operators, and/or without requiring significant changes to the operation at the clients.

The example embodiments described herein may be adapted for use in different applications. For example, although the present disclosure describes example embodiments in the context of horizontal federated learning, the example embodiments discussed herein may be adapted for use in distributed learning or multitask learning, particularly when non-IID clients are involved.

Because federated learning enables machine learning without violating the privacy of the clients, the example embodiments of the present disclosure may be used for learning a model using machine learning and collaboration among clients, without compromising data privacy. Accordingly, the example embodiments disclosed herein may enable practical application of machine learning in settings where privacy is important, such as in health settings, or other contexts where there may be legal obligations to ensure privacy.

Other applications of the present disclosure include application in the context of autonomous driving (e.g., autonomous vehicles may provide data to learn an up-to-date model related to traffic, construction, or pedestrian behavior, to promote safe driving), or in the context of a network of sensors (e.g., individual sensors may perform local learning of a model, to avoid sending large amounts of data back to the central server). Other possible applications include applications in the context of mobile communication, where horizontal federated learning may be used to learn user behaviors to improve service and/or improve efficiency (e.g., to better manage power usage and/or CPU control). Example embodiments of the present disclosure may also have applications in the context of the internet of things (IoT), in which a client may be any IoT-capable device (e.g., lamp, fridge, oven, desk, door, window, air conditioner, etc. having IoT capabilities).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute example embodiments of the methods disclosed herein. The machine-executable instructions may be in the form of code sequences, configuration information, or other data, which, when executed, cause a machine (e.g., a processor or other processing device) to perform steps in a method according to example embodiments of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computing system comprising:
a memory; and
a processing device in communication with the memory, the processing device configured to execute instructions to cause the computing system to carry out collaborative learning of local models across a plurality of clients in communication with the computing system, by:
initializing a respective plurality of sets of local model parameters for the respective plurality of clients, the initializing comprising:
obtaining, from the plurality of clients, information about model structures of the respective local models;
generating a common set of initial model parameters; and
providing the common set of initial model parameters to be sent to the plurality of clients to cause each respective client to initialize the respective local model using the common set of initial model parameters, to cause all local models across the plurality of clients to be initially equivalent;
conducting iterations of collaborative learning, wherein one iteration of collaborative learning comprises:
obtaining, from the plurality of clients, a plurality of sets of local model parameters, each set of local model parameters having been learned at a respective client;
computing, for each given set of local model parameters, one or more collaboration coefficients representing a similarity between the given set of local model parameters and each other one of the sets of local model parameters;
performing updating of the plurality of sets of local model parameters to obtain a respective plurality of sets of updated local model parameters by, for each given set of local model parameters, updating the given set of local model parameters using a weighted aggregation of the other sets of local model parameters, the weighted aggregation being computed using the one or more collaboration coefficients; and
providing the plurality of sets of updated local model parameters to be sent to the plurality of clients to cause each respective client to update the respective local model using the respective set of updated local model parameters; and
ending the iterations of collaborative learning after a convergence condition is satisfied.

2. The computing system of claim 1, wherein the processing device is configured to execute instructions to cause the computing system to compute the one or more collaboration coefficients by, for each given set of local model parameters:
computing a cosine similarity between the given set of local model parameters and each respective other one of the sets of local model parameters; and
normalizing the cosine similarity values to obtain the respective collaboration coefficients representing the similarity between the given set of local model parameters and each respective other one of the sets of local model parameters.

3. The computing system of claim 1, wherein the processing device is configured to execute instructions to cause the computing system to perform updating by, for each given set of local model parameters:
computing a weighted average of the other sets of local model parameters, the weighted average being the weighted aggregation; and
adding the weighted average to the given set of local model parameters.

4. The computing system of claim 1, wherein the processing device is configured to execute instructions to further cause the computing system to obtain the plurality of sets of model parameters by:
transmitting a request to an agent at each client, for a respective set of local model parameters, the respective set of local model parameters having been learned using private data at the respective client.

5. The computing system of claim 1, wherein the processing device is configured to execute instructions to cause the computing system to compute the one or more collaboration coefficients by, for each given set of local model parameters:
computing a Euclidean distance between the given set of local model parameters and each respective other one of the sets of local model parameters, wherein computed Euclidean distances are used as the respective collaboration coefficients representing the similarity between the given set of local model parameters and each respective other one of the sets of local model parameters.

6. The computing system of claim 1, wherein the processing device is configured to execute instructions to cause the computing system to compute the one or more collaboration coefficients by:
grouping the sets of local model parameters into clusters; and for a first set of local model parameters belonging to a first cluster and a second set of local model parameters belonging to a second cluster, compute the collaboration coefficient between the first and second clusters based on a distance between the first cluster and the second cluster.

7. A method for horizontal federated learning, the method comprising:
carrying out collaborative learning of local models across a plurality of clients, by:
initializing a respective plurality of sets of local model parameters for the respective plurality of clients, the initializing comprising:
obtaining, from the plurality of clients, information about model structures of the respective local models;
generating a common set of initial model parameters; and
providing the common set of initial model parameters to be sent to the plurality of clients to cause each respective client to initialize the respective local model using the common set of initial model parameters, to cause all local models across the plurality of clients to be initially equivalent;
conducting iterations of collaborative learning, wherein carrying out one iteration of collaborative learning comprises:
obtaining, from the plurality of clients, a plurality of sets of local model parameters, each set of local model parameters having been learned at a respective client;
computing, for each given set of local model parameters, one or more collaboration coefficients representing a similarity between the given set of local model parameters and each other one of the sets of local model parameters;
performing updating of the plurality of sets of local model parameters to obtain a respective plurality of sets of updated local model parameters by, for each given set of local model parameters, updating the given set of local model parameters using a weighted aggregation of the other sets of local model parameters, the weighted aggregation being computed using the one or more collaboration coefficients; and
providing the plurality of sets of updated local model parameters to be sent to the plurality of clients to cause each respective client to update the respective local model using the respective set of updated local model parameters; and
ending the iterations of collaborative learning after a convergence condition is satisfied.

8. The method of claim 7, wherein computing the one or more collaboration coefficients comprises, for each given set of local model parameters:
computing a cosine similarity between the given set of local model parameters and each respective other one of the sets of local model parameters; and
normalizing the cosine similarity values to obtain the respective collaboration coefficients representing the similarity between the given set of local model parameters and each respective other one of the sets of local model parameters.

9. The method of claim 7, wherein performing updating comprises, for each given set of local model parameters:
computing a weighted average of the other sets of local model parameters, the weighted average being the weighted aggregation; and
adding the weighted average to the given set of local model parameters.

10. The method of claim 7, wherein obtaining the plurality of sets of local model parameters comprises:
transmitting a request to an agent at each client, for a respective set of local model parameters, the respective set of local model parameters having been learned using private data at the respective client.

11. The method of claim 7, wherein computing the one or more collaboration coefficients comprises, for each given set of local model parameters:
computing a Euclidean distance between the given set of local model parameters and each respective other one of the sets of local model parameters, wherein computed Euclidean distances are used as the respective collaboration coefficients representing the similarity between the given set of local model parameters and each respective other one of the sets of local model parameters.

12. The method of claim 7, wherein computing the one or more collaboration coefficients comprises:
grouping the sets of local model parameters into clusters; and
for a first set of local model parameters belonging to a first cluster and a second set of local model parameters belonging to a second cluster, compute the collaboration coefficient between the first and second clusters based on a distance between the first cluster and the second cluster.

13. A non-transitory computer-readable medium having instructions stored thereon, wherein the instructions, when executed by a processing device of a computing system, cause the computing system to carry out collaborative learning of local models across a plurality of clients in communication with the computing system by:
initializing a respective plurality of sets of local model parameters for the respective plurality of clients, the initializing comprising:
obtaining, from the plurality of clients, information about model structures of the respective local models;
generating a common set of initial model parameters; and
providing the common set of initial model parameters to be sent to the plurality of clients to cause each respective client to initialize the respective local model using the common set of initial model parameters, to cause all local models across the plurality of clients to be initially equivalent;
conducting iterations of collaborative learning, wherein one iteration of collaborative learning comprises:
obtaining, from the plurality of clients, a plurality of sets of local model parameters, each set of local model parameters having been learned at a respective client;
computing, for each given set of local model parameters, one or more collaboration coefficients representing a similarity between the given set of local model parameters and each other one of the sets of local model parameters;
performing updating of the plurality of sets of local model parameters to obtain a respective plurality of sets of updated local model parameters by, for each given set of local model parameters, updating the given set of local model parameters using a weighted aggregation of the other sets of local model parameters, the weighted aggregation being computed using the one or more collaboration coefficients; and providing the plurality of sets of updated local model parameters to be sent to the plurality of clients to cause each respective client to update the respective local model using the updated local model parameters; and ending the iterations of collaborative learning after a convergence condition is satisfied.

14. The non-transitory computer-readable medium of claim 13, wherein the instructions further cause the computing system to compute the one or more collaboration coefficients by, for each given set of local model parameters:

computing a cosine similarity between the given set of local model parameters and each respective other one of the sets of local model parameters; and normalizing the cosine similarity values to obtain the respective collaboration coefficients representing the similarity between the given set of local model parameters and each respective other one of the sets of local model parameters.

15. The non-transitory computer-readable medium of claim 13, wherein the instructions further cause the computing system to perform updating by, for each given set of local model parameters:

computing a weighted average of the other sets of local model parameters, the weighted average being the weighted aggregation; and adding the weighted average to the given set of local model parameters.

16. The non-transitory computer-readable medium of claim 13, wherein the instructions further cause the computing system to obtain the plurality of sets of local model parameters by:

transmitting a request to an agent at each client, for a respective set of local model parameters, the respective set of local model parameters having been learned using private data at the respective client.

17. The non-transitory computer-readable medium of claim 13, wherein the instructions further cause the computing system to compute the one or more collaboration coefficients by, for each given set of local model parameters:

computing a Euclidean distance between the given set of local model parameters and each respective other one of the sets of local model parameters, wherein computed Euclidean distances are used as the respective collaboration coefficients representing the similarity between the given set of local model parameters and each respective other one of the sets of local model parameters.

18. The non-transitory computer-readable medium of claim 13, wherein the instructions further cause the computing system to compute the one or more collaboration coefficients by:

grouping the sets of local model parameters into clusters; and for a first set of local model parameters belonging to a first cluster and a second set of local model parameters belonging to a second cluster, compute the collaboration coefficient between the first and second clusters based on a distance between the first cluster and the second cluster.

* * * * *